(12) United States Patent
Nakhjavani

(10) Patent No.: US 10,239,635 B2
(45) Date of Patent: Mar. 26, 2019

(54) METHODS FOR BALANCING AIRCRAFT ENGINES BASED ON FLIGHT DATA

(71) Applicant: The Boeing Company, Chicago, IL (US)

(72) Inventor: Omid B. Nakhjavani, Tukwila, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/617,338

(22) Filed: Jun. 8, 2017

(65) Prior Publication Data

US 2018/0354646 A1    Dec. 13, 2018

(51) Int. Cl.
| | |
|---|---|
| *B64F 5/40* | (2017.01) |
| *G06N 3/04* | (2006.01) |
| *G06N 3/08* | (2006.01) |
| *B64D 27/16* | (2006.01) |
| *B64D 45/00* | (2006.01) |

(52) U.S. Cl.
CPC .............. *B64D 45/00* (2013.01); *B64D 27/16* (2013.01); *B64F 5/40* (2017.01); *G06N 3/0454* (2013.01); *G06N 3/08* (2013.01); *B64D 2045/0085* (2013.01)

(58) Field of Classification Search
CPC ............ B64D 45/00; B64D 27/16; B64D 2045/0085; B64F 5/40; G06N 3/0454; G06N 3/08

See application file for complete search history.

(56) References Cited

U.S. PATENT DOCUMENTS

| | | | |
|---|---|---|---|
| 4,098,127 A | 7/1978 | Shiga et al. | |
| 4,485,678 A * | 12/1984 | Fanuele | G01H 1/003 700/279 |
| 5,172,325 A * | 12/1992 | Heidari | G01M 1/20 700/279 |
| 5,586,065 A * | 12/1996 | Travis | G10K 11/178 702/191 |
| 6,711,952 B2 | 3/2004 | Leamy et al. | |
| 7,243,023 B2 | 7/2007 | Skilton | |
| 7,321,809 B2 | 1/2008 | Vian et al. | |
| 7,371,042 B2 | 5/2008 | Lee | |

(Continued)

*Primary Examiner* — Behrang Badii
*Assistant Examiner* — Daniel L Greene
(74) *Attorney, Agent, or Firm* — Ostrager Chong Flaherty & Broitman P.C.

(57) ABSTRACT

A method for balancing an aircraft turbofan engine using a respective artificial neural network for each flight of multiple reference aircraft to predict the engine vibrations that would be produced in response to input of flight parameter and balance weight data acquired from a flight of a test aircraft of the same type. The resulting sets of predicted vibrations are then processed to identify and collect those engine vibration predictions which match or nearly match the engine vibration measurements acquired from the test aircraft during its flight test. For each matching modeled flight of the reference aircraft, the magnitude and phase angle of the mass vector for any commonly used balance weight configurations are determined and included in a list of recommended balance weight configurations. A technician can then reconfigure the balance weights attached to the engine on the test aircraft in accordance with a selected recommendation.

20 Claims, 5 Drawing Sheets

(56) References Cited

U.S. PATENT DOCUMENTS

| | | | |
|---|---|---|---|
| 7,539,594 B2* | 5/2009 | Lee | F01D 5/027 702/147 |
| 8,313,279 B2 | 11/2012 | Mollmann | |
| 9,347,321 B2 | 5/2016 | Heidari et al. | |
| 9,587,512 B1 | 3/2017 | Skilton et al. | |
| 2004/0143357 A1* | 7/2004 | Schwarm | G05B 15/02 700/121 |
| 2005/0065712 A1* | 3/2005 | Skilton | F01D 5/027 701/124 |
| 2006/0053882 A1* | 3/2006 | Lee | F01D 5/027 73/460 |
| 2008/0152498 A1* | 6/2008 | Mollmann | F01D 5/027 416/144 |
| 2009/0263247 A1* | 10/2009 | Mollmann | F01D 21/003 416/144 |
| 2013/0149130 A1 | 6/2013 | Hasting et al. | |
| 2013/0332025 A1* | 12/2013 | Ziarno | G05B 23/0213 701/33.4 |
| 2014/0236450 A1* | 8/2014 | Care | F01D 5/027 701/100 |
| 2015/0330869 A1* | 11/2015 | Ziarno | G01M 15/14 701/34.4 |
| 2016/0032725 A1* | 2/2016 | Heidari | G01M 1/22 701/33.1 |

\* cited by examiner

FIG. 6A

BALANCE WEIGHT MAGNITUDES FOR ANN MATCH FLIGHTS

| FLIGHT TEST | FLIGHT MATCH ALL | |
|---|---|---|
| AB123_B1E1 | AC222_B2E2_49 | 318.8 |
| | AC222_B2E2_52 | 318.8 |
| | AD915_B1E2_48 | 615.9 |
| | AD915_B1E2_51 | 615.9 |
| | AE005_B2E1_47 | 237.5 |
| | AE005_B2E1_50 | 237.5 |

FIG. 6B

BALANCE WEIGHT PHASES FOR ANN MATCH FLIGHTS

| FLIGHT TEST | FLIGHT MATCH ALL | |
|---|---|---|
| AB123_B1E1 | AC222_B2E2_49 | 355.0 |
| | AC222_B2E2_52 | 355.0 |
| | AD915_B1E2_48 | 160.0 |
| | AD915_B1E2_51 | 160.0 |
| | AE005_B2E1_47 | 95.0 |
| | AE005_B2E1_50 | 95.0 |

METHODS FOR BALANCING AIRCRAFT ENGINES BASED ON FLIGHT DATA

BACKGROUND

This disclosure generally relates to systems and methods for balancing rotating machinery to reduce or minimize vibrations. In particular, the disclosed embodiments relate to systems and methods for balancing gas turbine aircraft engines.

It is either impossible or nearly impossible, as a practical matter, to build a rotating structure that is perfectly balanced upon manufacture. Any such structure will produce a certain amount of undesired vibration to a greater or lesser extent. Such vibration is usually passed through bearings that support the rotating part of the structure, and can therefore manifest itself as unwanted noise or vibration in adjacent structures. As is known to those skilled in the art, synchronous vibration may be characterized by an amplitude (i.e., magnitude) and a phase angle (i.e., direction). Thus, the vibration of a part may be represented as a vector or phasor.

One type of rotating machinery susceptible to undesired vibration is the high-bypass turbofan engine used in commercial aviation. Such engines have a large number of rotating elements. These rotating elements can be grouped according to the relative speed of rotation. Some of the rotating elements form a low-speed rotating system and other rotating elements form one or more high-speed rotating systems. More specifically, each rotating system of a gas turbine engine comprises an upstream rotating multi-stage compressor connected to a downstream multi-stage turbine by means of a shaft. The low-pressure turbine and low-pressure compressor are connected by a low-pressure shaft; the high-pressure turbine and high-pressure compressor are connected by a high-pressure shaft which surrounds a portion of the low-pressure shaft, with the high-pressure compressor and turbine being disposed between the low-pressure compressor and turbine. The fan of the turbofan engine is the first stage of the low-pressure compressor. Vibration caused by unbalances in the various stages of a turbofan engine contributes to wear and fatigue in engine components and surrounding structures, and unwanted noise in the passenger cabin of the airplane.

One way of reducing structurally transmitted vibrations is to balance the rotating systems of aircraft engines on an individual basis. Engine balancing is well known in the aircraft art. The manufacturers of turbofan engines have developed techniques for controlling the magnitude of unwanted vibration by affixing balancing mass to the engine. Typically, the fan and the last stage of the low-pressure turbine of a turbofan engine are the only accessible locations for applying balancing mass after the engine is manufactured or assembled. Internal stages are inaccessible as a practical matter.

A known method for applying balancing mass involves the selection of a combination of balancing screws from a set of screws of different standard mass, with screws being threadably inserted into respective threaded holes located around an outer periphery of an internal turbofan engine component (such as a fan spinner). For example, to achieve a balance, one or more screws of the same mass or different masses can be screwed into respective threaded holes, thereby producing a center of gravity which is closer to the axis of rotation than was the case without balancing. The total effect of multiple attached balancing masses can be determined by treating each mass and its respective location as a mass vector, originating at the axis of rotation, and performing a vector sum.

The specification of the location (i.e., including both distance from the axis of rotation and phase angle) and amount of mass to be applied to a rotating system in order to balance it is referred to herein as the balance solution for the rotating system. In order to determine balance solutions for rotating systems of turbofan engines, vibration data is obtained. Vibration data is a measure of the amount of vibration that an engine is producing at various locations as the engine is operated at various speeds and through ranges of other parameters (such as altitude). Vibration data can be gathered at an engine balancing facility located on the ground or during flight. If accelerometers are used to capture rotating system vibration response, synchronous vibration data may be derived using a keyphasor index on the rotating system. While multiple methods known to the art can be used to capture and derive vibration data, that data should contain a displacement as well as a phase corresponding to synchronous vibration. After vibration data is obtained, the vibration data, measured at accelerometers, and the sensitivity of the accelerometers to unit weights applied at the balance locations are used to derive a balance solution that attempts to minimize the vibration of the engine producing the data.

Jet engines generate vibratory loads due to inherent imbalance on each stage of the rotating shafts which transfer through bearings to propulsion stationary structures and are transmitted through wing structures to emerge as cabin noise and vibration. Airframe manufacturers seek to keep cabin noise and vibration at low levels to ensure passenger and crew ride comfort. Typically, airframe and engine manufacturers agree on the level of engine vibration limits measured during engine runs on a test cell at two sensors before shipment to the airframe manufacturer for installation on an airplane. Normally, engine vibrations during airplane ground runs are close to the levels measured on a test cell. However, engine vibrations during flight can be much higher than ground-run levels, causing excessive cabin noise and vibration. Higher engine vibrations during flight may be caused by extra fan imbalance due to fan blade movement during flight, especially for a new generation of engines with wide-chord fan blades. As a result, subsequent flight tests may be needed and engine balancing may be performed after each one until acceptable cabin noise and vibration levels are obtained. Each flight test costs significant time and money to conduct.

It would be beneficial to provide a balancing approach which minimizes the number of flight tests and balancing operations resulting from the foregoing issues.

SUMMARY

The subject matter disclosed in some detail below is directed to a method for balancing aircraft turbofan engines having dynamic unbalance characteristics to minimize vibrations. The method uses a multiplicity of artificial neural networks (ANNs) to predict the engine vibrations that would be produced by one or more modeled flights by each of a multiplicity of reference aircraft (one neural network for each flight) of the same type in response to input of a set of design variable values derived from a test aircraft (not a reference aircraft) of the same type. The resulting sets of predicted vibrations produced by the artificial neural networks are then processed (e.g., using a pattern matching algorithm) to identify and collect those engine vibration predictions which match or are closest to the engine vibration measurements acquired from the test aircraft during its flight test. For each artificial neural network that produces matching or nearly matching vibration predictions, the magnitude and phase angle of the mass vector of the balance weight configuration in place on the engine for those particular modeled flights of reference aircraft are determined and then compared to commonly used balance weight magnitudes and phase angles (hereinafter "common balance weight configurations"). Any uncommon balance weight configurations from matching modeled flights of reference aircraft are filtered out (i.e., removed from further consideration) and not included in a list of recommended balance weight configurations. (As used herein, the term "matching modeled flight" means a flight by a reference aircraft that was modeled by its associated artificial neural network to have predicted engine vibrations that matched or nearly matched the measured engine vibrations experienced by a test aircraft during a test flight.) The technician can then reconfigure the balance weights attached to the engine on the test aircraft in accordance with any one of the recommendations selected from the list.

The artificial neural networks and the pattern matching algorithm may be implemented as computer code representing instructions to be executed (which computer code is stored in a non-transitory tangible computer-readable storage medium). The operations of the artificial neural networks and the pattern matching algorithm may be executed by one computer or by multiple computers of a distributed computer system.

One aspect of the subject matter described in some detail below is an engine balancing method comprises the following steps: (a) acquiring flight parameter data, balance weight data and vibration data from one or more flights by each of a multiplicity of reference aircraft of the same type; (b) using the flight parameter data, balance weight data and vibration data for each flight of a reference aircraft to train a respective associated artificial neural network to output vibration data representing predicted vibrations for an engine in response to input of respective flight parameter data for the associated flight; (c) acquiring flight parameter data, balance weight data and vibration data from a flight by a test aircraft having an engine to be balanced, wherein the test aircraft is the same type; (d) using the artificial neural networks to predict the engine vibrations that would be produced by each reference aircraft based on the input of flight parameter data and balance weight data from the flight by the test aircraft; (e) identifying engine vibration predictions output by the artificial neural networks which match or nearly match the engine vibration measurements acquired from the test aircraft during its flight; (f) for each artificial neural network that produced matching or nearly matching engine vibration predictions, determining balance weight configurations in place on the engines for the flights of reference aircraft whose associated artificial neural network produced matching or nearly matching engine vibration predictions; (g) generating a report that includes a set of recommendations in the form of balance weight configurations from the flights of reference aircraft whose associated artificial neural network produced matching or nearly matching vibration predictions; and (h) reconfiguring the balance weights attached to the engine on the test aircraft in accordance with one of the recommendations.

In accordance with one embodiment, the method described in the preceding paragraph further comprises: determining whether a balance weight magnitude of any of the balance weight configurations determined in step (f) is an outlier balance weight magnitude that lies out of a range of common balance weight magnitudes, wherein the report does not include balance weight configurations having outlier balance weight magnitudes. In addition or in the alternative, the method described in the preceding paragraph further comprises: determining whether a balance weight phase angle of any of the balance weight configurations determined in step (f) is an outlier balance weight phase angle that lies out of a range of common balance weight phase angles, wherein the report does not include balance weight configurations having outlier balance weight phase angles.

Another aspect of the subject matter disclosed in detail below is a method for balancing a gas turbine aircraft engine, comprising: (a) acquiring flight parameter data, balance weight data and vibration data from one or more flights by each of a multiplicity of reference aircraft of the same type; (b) using the flight parameter data, balance weight data and vibration data for each flight of a reference aircraft to train a respective associated artificial neural network to output vibration data representing predicted vibrations for an engine in response to input of respective flight parameter data for the associated flight; (c) acquiring flight parameter data, balance weight data and vibration data from a flight by a test aircraft having an engine to be balanced, wherein the test aircraft is the same type; (d) using the artificial neural networks to predict the engine vibrations that would be produced by each reference aircraft based on the input of flight parameter data and balance weight data from the flight by the test aircraft; (e) identifying engine vibration predictions output by the artificial neural networks which match or nearly match the engine vibration measurements acquired from the test aircraft during its flight; (f) for each artificial neural network that produced matching or nearly matching vibration predictions, determining the magnitude and phase angle of a mass vector for each balance weight configuration that was in place on an engine for flights of reference aircraft whose associated artificial neural network produced matching or nearly matching engine vibration predictions; (g) generating a report that includes magnitudes and phase angles of mass vectors determined in step (f); (h) selecting a magnitude and a phase angle included in the report; and (i) reconfiguring the balance weights attached to the engine on the test aircraft in accordance with the selected magnitude and phase angle. In accordance with some embodiments, this method further comprises: determining whether the magnitude of the mass vector of any of the balance weight configurations determined in step (f) lies out of a range of common magnitudes; and determining whether the phase angle of the mass vector of any of the balance weight configurations determined in step (f) lies out of a range of common phase angles, wherein uncommon magnitudes and phase angles are not included in the report.

A further aspect of the subject matter disclosed in detail below is a gas turbine aircraft engine comprising a fan spinner and one or more balance weights attached to the fan spinner, wherein the engine was balanced using a method comprising: (a) acquiring flight parameter data, balance weight data and vibration data from one or more flights by each of a multiplicity of reference aircraft of the same type; (b) using the flight parameter data, balance weight data and vibration data for each flight of a reference aircraft to train a respective associated artificial neural network to output vibration data representing predicted vibrations for an engine in response to input of respective flight parameter data for the associated flight; (c) acquiring flight parameter data, balance weight data and vibration data from a flight by a test aircraft having an engine to be balanced, wherein the test aircraft is the same type; (d) using the artificial neural networks to predict the engine vibrations that would be produced by each reference aircraft based on the input of flight parameter data and balance weight data from the flight by the test aircraft; (e) identifying engine vibration predictions output by the artificial neural networks which match or nearly match the engine vibration measurements acquired from the test aircraft during its flight; (f) for each artificial neural network that produced matching or nearly matching vibration predictions, determining the magnitude and phase angle of a mass vector for each balance weight configuration that was in place on an engine for flights of reference aircraft whose associated artificial neural network produced matching or nearly matching engine vibration predictions; (g) selecting a magnitude and a phase angle from the magnitudes and phase angles of mass vectors determined in step (f); and (h) reconfiguring the balance weights attached to the engine on the test aircraft in accordance with the selected magnitude and phase angle.

Other aspects of methods for balancing gas turbine aircraft engines are disclosed and claimed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

FIG. 6A is a diagram representing a portion of a bar chart that is included in a final report in accordance with one embodiment, each horizontal bar having a length corresponding to the magnitude of the mass vector of the balance weight configuration in place on an engine of the identified reference aircraft for a respective one of the plurality of matching modeled flights.

FIG. 6B is a diagram representing a portion of a bar chart that is included in the final report partly depicted in FIG. 6A, each horizontal bar having a length corresponding to the phase angle of the mass vector of the same balance weight configuration in place on the same engine of the same reference aircraft for the same matching modeled flight.

Reference will hereinafter be made to the drawings in which similar elements in different drawings bear the same reference numerals.

DETAILED DESCRIPTION

For the purpose of illustration, systems and methods for balancing gas turbine aircraft engines now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
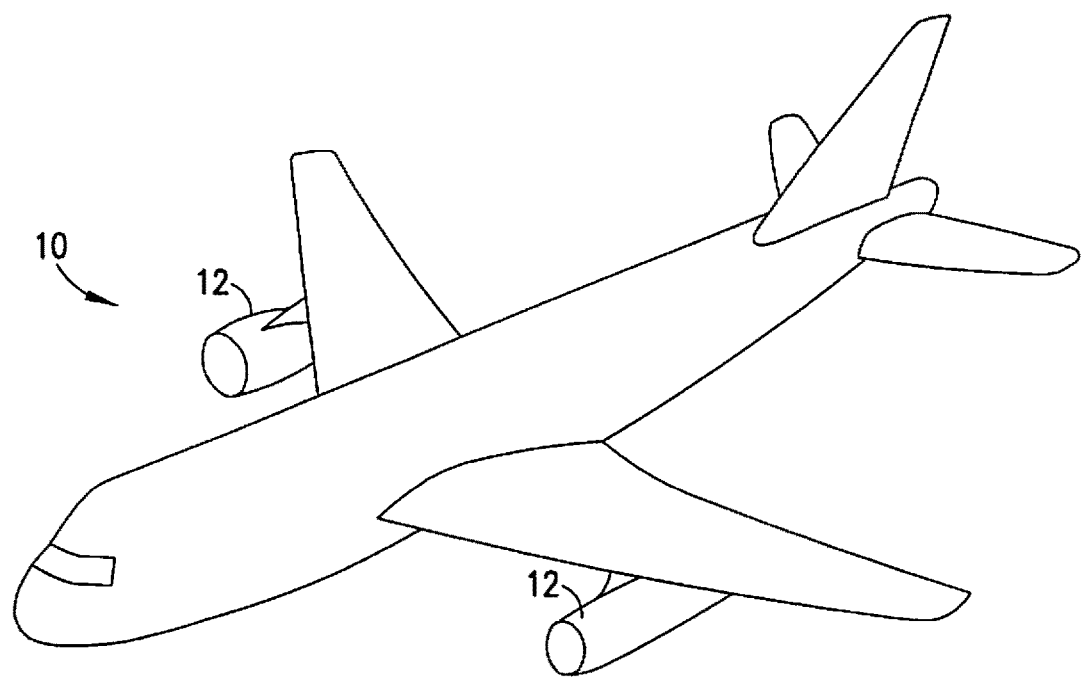
FIG. 1 is a diagram showing a perspective view of one example of an aircraft having gas turbine engines.
Figure 2:
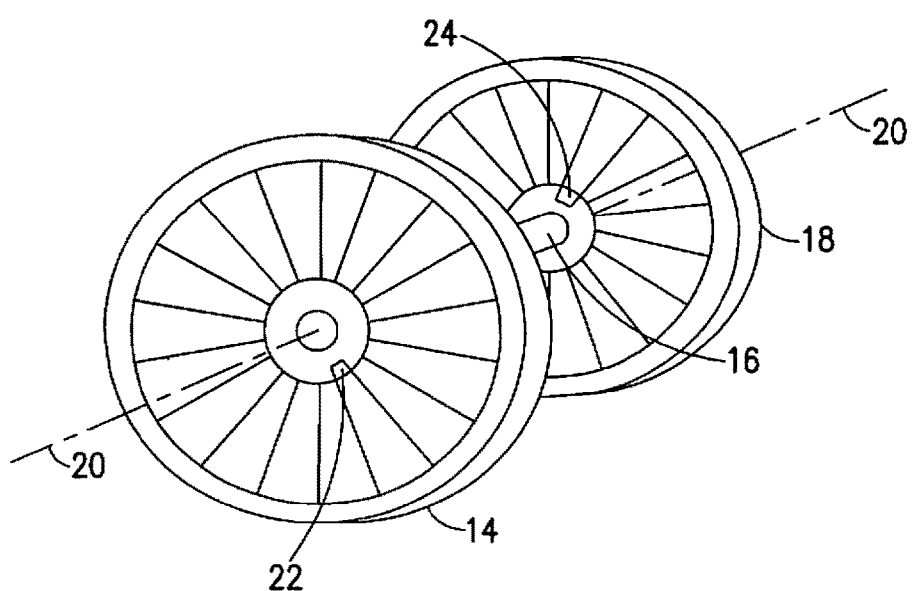
FIG. 2 is a diagram showing a perspective view of idealized rotating components of a turbojet engine.

FIG. 1 shows an aircraft 10 having a pair of gas turbine engines 12. Although the engines may be turbojet engines or turbofan engines, FIG. 2 is an idealized depiction of some rotating components of a turbojet engine. In particular, FIG. 2 shows a compressor rotor 14, a shaft 16, and a turbine rotor 18, both rotors being mounted on the shaft 16. This is just one example of a type of rotating machinery which can be balanced using the methodology disclosed hereinafter.

Due to many factors, such as manufacturing and assembly tolerances, distortion over time, and/or wear, it is unlikely that the center of mass of the compressor rotor 14 and/or turbine rotor 18 will perfectly match a geometric axis of rotation 20 of the assembly. Therefore, an attachment point 22 may be included on compressor rotor 14 and/or an attachment point 24 may be included on turbine rotor 18. Balancing masses may be added at the attachment points to balance the assembly about its axis of rotation 20. A balancing mass is intended to alter the center of mass of the rotating assembly to better align or coincide with the axis of rotation 20, thereby reducing if not minimizing vibrations.

Figure 3:
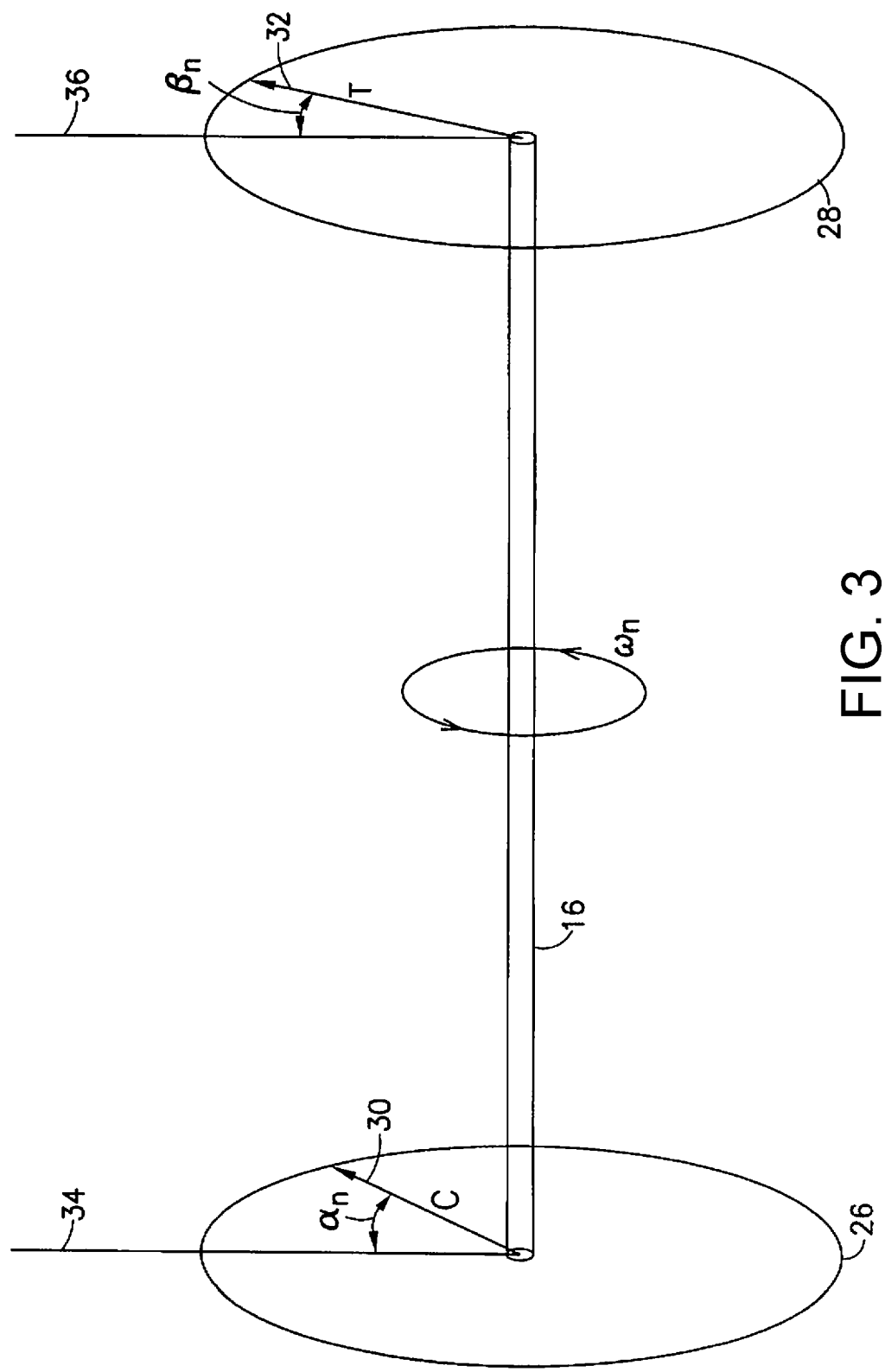
FIG. 3 is a vector diagram representing vibrations generated during rotation of the rotating components depicted in idealized form in FIG. 2.

FIG. 3 is a vector diagram depicting the forces exerted on a gas turbine engine due to vibrations of the compressor and turbine rotors. The shaft 16 is shown rotating at a speed $\omega_n$ between a forward unbalance plane 26 and an aft unbalance plane 28. The aft unbalance plane 28 corresponds to the location where a turbine rotor is located (toward the aft end of the engine) and where the vibration induced by the turbine rotor acts on the engine. For a particular instant in time, an unbalanced condition T of the turbine rotor is depicted as a vector 32. Likewise, the forward unbalance plane 26 corresponds to the location where a compressor rotor (or a fan) is located (toward the forward end of the engine) and where the vibration induced by the compressor rotor (or fan) acts on the engine. For the same particular instant in time, an unbalanced condition C of the compressor rotor is depicted as a vector 30.

The vector 30 has a magnitude and a phase angle $\alpha_n$, (relative to axis 34) at the engine revolutions per minute (rpm) $\omega_n$. Similarly, the unbalanced displacement vector 32 has a magnitude and a phase angle $\beta_n$, (relative to axis 36) at the engine rpm $\omega_n$. The magnitudes and phase angles of vectors 30 and 32 can be determined using any suitable technique known in the art, for example, an influence coefficient method of balancing can be employed. The use of influence coefficients to balance aircraft engines is well known. These influence coefficients are arranged to form a sensitivity matrix that quantifies the change in vibration level at the engine vibration sensors due to a unit increase in unbalance level at unbalance source locations (e.g., at the fan).

In the case of a high-bypass turbofan engine, a known balancing method takes into account the effects of plane unbalances at the fan and the last stage of the low-pressure turbine, and other plane unbalances caused by stages that lack means for mounting balance weights. The as-built vibration at any location in an engine is at least in part due to such unbalances, although some stages typically affect the overall unbalance more than others. The influences of unbalances in all of the stages of the rotating system can be related to the accessible stages using influence coefficients, which can be derived from the vibrational responses when different balancing masses are installed and the system is operated. These vibrational responses are measured at various shaft speeds using sensor pickups (e.g., accelerometers). In practice, any engine that has unacceptably high unbalances after manufacture can be first run on the ground to measure its as-built vibration via sensor pickups. These measurements can be taken over the engine operating range of speeds (measured in rpm). Such data may be recorded when the engine is operating at a specific shaft speed. Measurements while the engine is on the ground do not take into account certain kinds of dynamic response now identified in aircraft engines. Such dynamic responses may be obtained from vibration data collected during a variety of conditions. In the case of aircraft engines, the majority of their service life will be spent in the air, rendering data taken only from test cell or ground conditions of limited value for achieving adequate balancing.

Influence coefficients determined for a particular location are representative of a response at a balancing plane or plane of interest. Influence coefficients may be expressed as a magnitude and a phase shift having units of displacement and angle per mass-length respectively. One set of magnitude units typically used is mils double amplitude per gram-centimeter. One known method of calculating influence coefficients for such planes or stages is to use measured data from a representative baseline engine ground run, and two trial runs, where data from each trial run is obtained from sensor pickups after placing trial masses on one or both balancing planes (e.g., fan and last stage of the low-pressure turbine). Trials may be conducted for the engine operating envelope. Thus, the influence coefficients can be calculated since the actual corrective masses added during any trial run are known, and the resultant change in vibration is also known because it can be measured at the sensor pickups.

In theory, the influence coefficients for a given engine, or from one engine to another of the same type or model, should be nearly identical. However, due to nonlinearity factors, manufacturing tolerances, measurement errors, wear, distortion over time, and other factors, it has been found that a single set of influence coefficients cannot be relied on. It is known in the prior art to implement a balancing method by a simple averaging of influence coefficients calculated for a number of engines, to obtain so-called generic influence coefficients usable for most engines with some level of confidence, or more exact influence coefficients can be calculated for each engine in the above-described manner. In accordance with a known balancing procedure, a history of an engine's characteristics, including predetermined influence coefficients for trim balancing, can be updated and stored for reference when performing the balancing procedure. These influence coefficients relate vibration data amplitude and phase at specific locations and shaft speeds to the mass unbalance at a reference position.

As previously noted, in order to determine balance solutions for the rotating systems of aircraft engines, vibration data is obtained. In the balancing methods disclosed herein, vibration data is gathered during flight and, optionally, from non-flight conditions. In accordance with one balancing method, the engine is operated for a period of time under different flight regimes such as take-off, climb, level-off, cruise, idle descent, etc. Operation in the different flight regimes exposes the engine to different power settings, altitudes, ambient temperatures, fan blade movement, and so forth. Such varying operating parameters influence the engine vibration characteristics, resulting in variation which can be measured for the full range of dynamic responses of interest by acquiring vibration data. The operational envelope of an engine may include time at elevated power settings, thermal loading, altitude variation, changes to rotational inertia as well as the full engine operating range for different flight regimes. For example, vibration data may be acquired for each engine throughout an entire flight of the aircraft, including takeoff, climb, cruise, descent and landing. This method subjects the engine to different operating conditions. For a particular speed of interest, there is typically a different vibration or accelerometer response associated with each operating condition. Multiple responses or data points are acquired for each speed or speed range of interest. The multitude of responses is more representative of in-service use or subsequent flights. The multitude of responses can be used advantageously to determine and apply a balance solution. The applied balance solution may have advantages over balance solutions that are based on single response, from a single operating condition, for each speed or speed range of interest.

Figure 4:
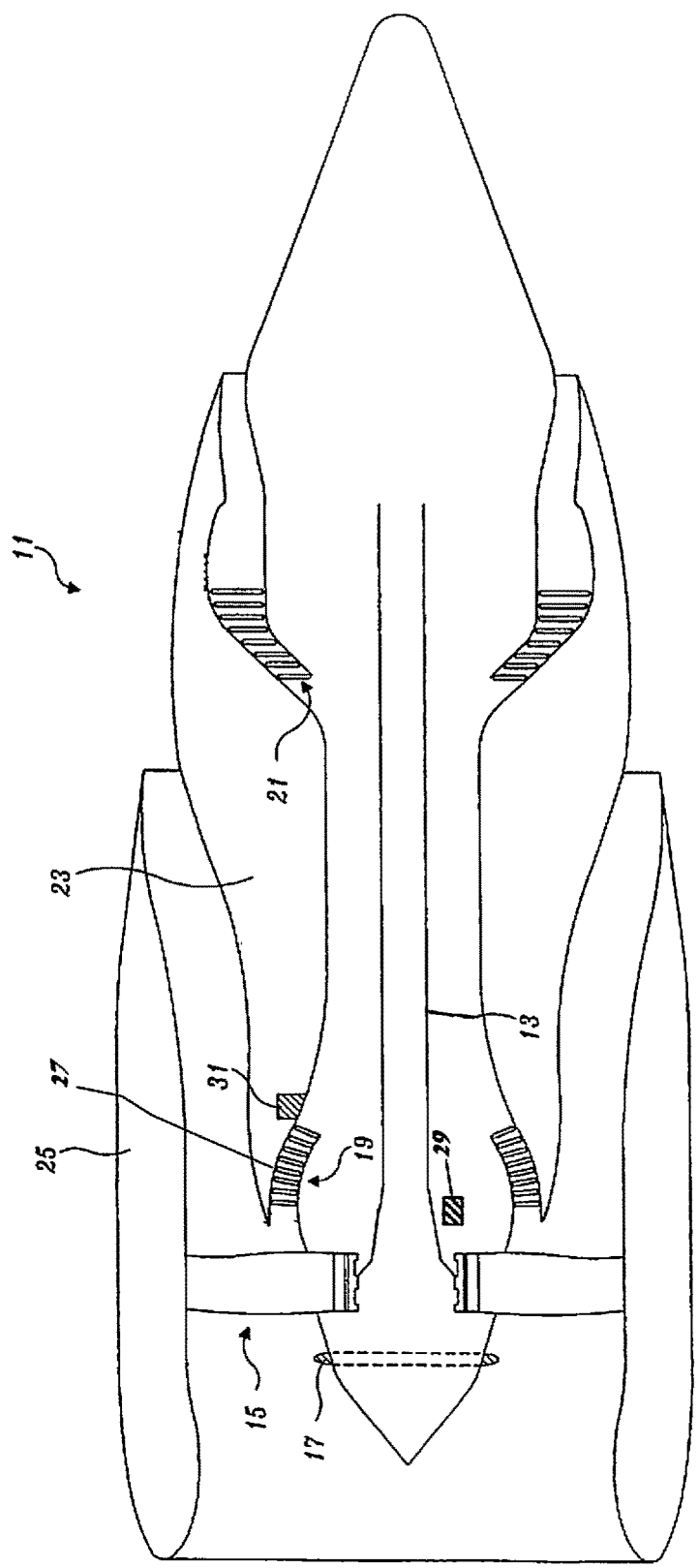
FIG. 4 is a is a side cut-away pictorial diagram of a typical high-bypass jet engine of the type used to power commercial aircraft.

Prior to describing one embodiment of an improved engine balancing method, a high-bypass jet engine of the type commonly used to power modern commercial aircraft will be briefly described. FIG. 4 is a side cut-away pictorial diagram of a typical high-bypass jet engine 11 of the type used to power commercial aircraft. The high-bypass jet engine 11 includes a low-speed rotating system comprising a low-speed shaft 13, a fan 15, a fan balance ring 17, a low-pressure compressor 19, and a low-pressure turbine 21. The engine 11 also includes a high-speed rotating system, which is not shown. Because the fan 15, fan balance ring 17, low-pressure compressor 19, and low-pressure turbine 21 are all connected to the low-speed shaft 13, all of these components rotate at the same speed as the low-speed shaft 13.

The fan balance ring 17 is disposed near the forwardmost portion of the low-speed shaft 13 and is affixed thereto. The fan balance ring 17 is circular and includes a plurality of holes (not shown) distributed at equal angular intervals near its circumference. The holes form receptacles for receiving balance weights. Thus, the function of the fan balance ring 17 is to receive balance weights that aid in balancing the low-speed rotating system of the engine 11.

The fan 15 of the engine 11 is disposed immediately behind the fan balance ring 17 and is comprised of a plurality of substantially identical blades that radiate outwardly from the low-speed shaft 13 at equal angular intervals. The individual blades that comprise the fan 15 are fixedly secured to the low-speed shaft 13. Disposed behind the fan 15 is the low-pressure compressor 19. The low-pressure compressor 19 consists of a plurality of compressor blades disposed adjacent one another and radially inwardly fixedly connected to the low-speed shaft 13 and radially outwardly contained within the fan frame compressor case 27. A first engine vibration sensor 31 is attached to the engine 11 at a first location (e.g., on the fan frame compressor case 27). A second engine vibration sensor 29 is attached to the engine 11 at a second location (e.g., on the forward-most bearing, also referred to herein as "Bearing No. 1", which bearing rotatably supports the forward end of the low-speed shaft 13). In some examples, the first and second engine vibration sensors are accelerometers.

An engine casing 23 of generally tubular shape is disposed circumferentially about the low-pressure shaft 13, extending from the low-pressure compressor 19 backward, past the low-pressure turbine 21. The engine casing 23 surrounds that portion of the engine that lies behind the fan 15. An engine nacelle 25 of generally tubular shape is disposed circumferentially about the fan 15 and a forward portion of the engine casing 23, extending from the fan 15 backward nearly to the point where the low-pressure turbine 21 is positioned. In some examples, the engine nacelle 25 may extend along some or the full length of the engine casing 23. Disposed at the forward portion of the engine casing 23 is a rotor speed sensor (not shown) that provides a signal indicative of the engine rpm of the low-speed shaft 13.

A method will now be described for balancing an engine of the type depicted in FIG. 4. The balancing method uses a multiplicity of artificial neural networks to predict the engine vibrations that would be produced by one or more modeled flights by each of a multiplicity of reference aircraft (one neural network for each flight) of the same type in response to input of a set of design variable values derived from a test aircraft (not a reference aircraft) of the same type. The resulting sets of predicted vibrations produced by the artificial neural networks are then processed (e.g., using a pattern matching algorithm) to identify and collect those engine vibration predictions which match or are closest to the engine vibration measurements acquired from the test aircraft during its flight test. For each artificial neural network that produces matching or nearly matching vibration predictions, the magnitude and phase angle of the mass vector of the balance weight configuration in place on the engine for those particular matching modeled flights of reference aircraft are determined, filtered and then included as recommendations in a final report. The technician can then reconfigure the balance weights attached to the engine on the test aircraft in accordance with one recommendation selected from the list.

Figure 5:
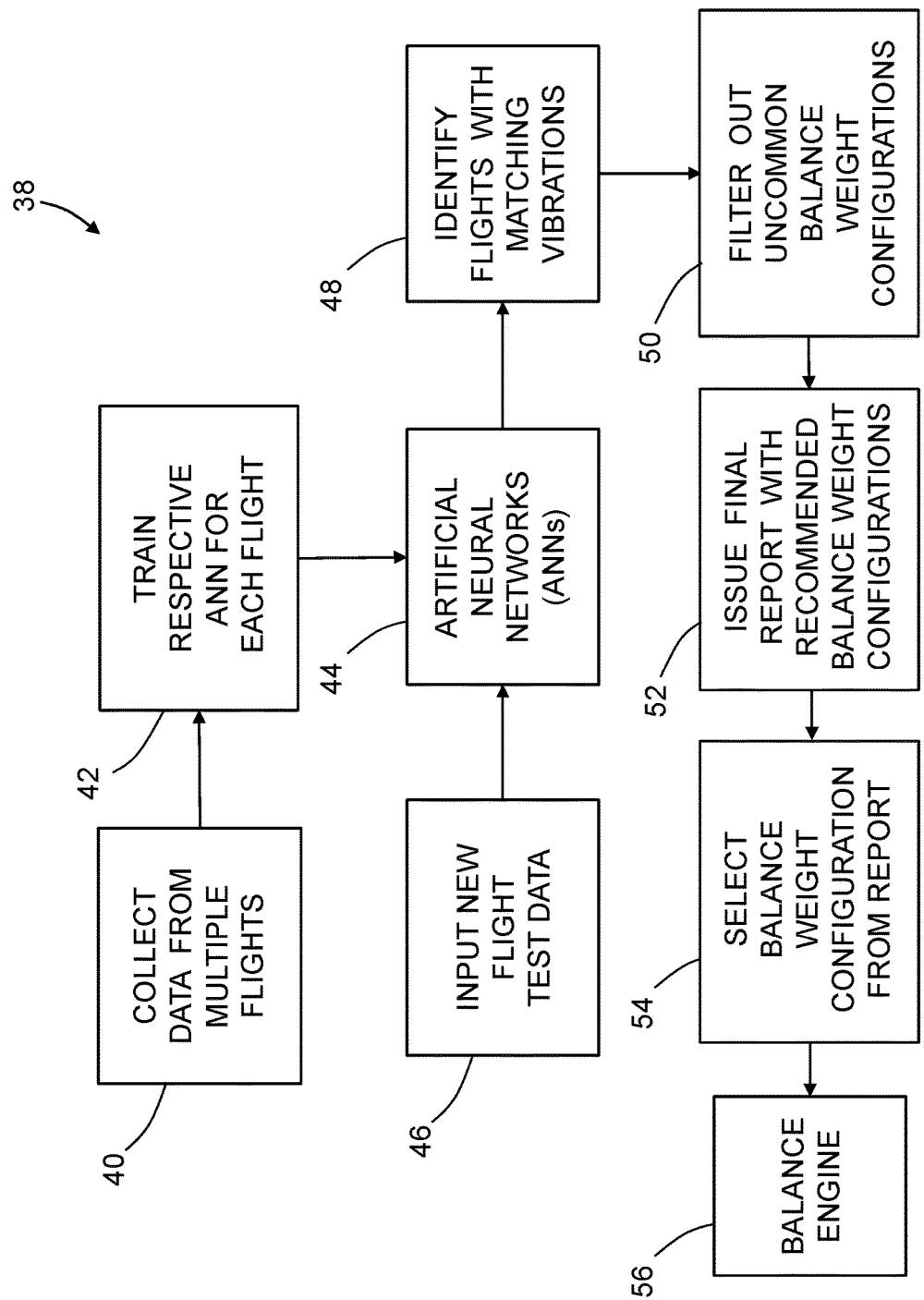
FIG. 5 is a flowchart identifying steps of a method for balancing a gas turbine aircraft engine in accordance with one embodiment.

FIG. 5 is a flowchart identifying steps of a method for balancing a gas turbine aircraft engine in accordance with one embodiment. The first step 40 of this process involves the collection of flight parameter data, balance weight data and vibration data for one or more flights by a multiplicity of reference aircraft of the same type for the purpose of constructing a reference engine balance database. During each flight of a reference aircraft, various flight parameters (e.g., engine rpm, altitude, Mach number, temperature and thrust) are monitored and samples of vibration data are acquired from each vibration sensor on each engine. For example, a data recorder, such as a digital flight data recorder or an airborne vibration monitor (AVM) box, can be configured to receive vibration data samples (amplitude and phase) from each vibration sensor in the sensor set along with shaft speed data (also referred to herein as "engine rpm data") from a tachometer. The sensor outputs can take the form of variable voltage or other signals, which can be converted to amplitude and phase by the AVM box (or flight data recorder). The collected flight parameter data, balance weight data and vibration data is then stored in a non-transitory tangible computer-readable storage medium. That non-transitory tangible computer-readable storage medium is accessible by a data processing system either directly or indirectly by way of a database server. The data processing system may comprise a computer system configured with software for processing data in the manner disclosed herein.

Still referring to FIG. 5, the flight parameter data, balance weight data and vibration data collected (i.e., acquired) in step 40 are then used by the data processing system to train a multiplicity of artificial neural networks 44, including a respective artificial neural network (ANN in FIG. 5) for each flight by a reference aircraft (step 42). For example, if data were collected from three flights for each of a first set of fifty reference aircraft, two flights for each of a second set of one hundred reference aircraft, and one flight for each of a third set of one hundred reference aircraft, then the total number of trained artificial neural networks 44 would be 150+200+100=450.

Each artificial neural network 44 is trained to model the vibratory response of an engine to a set of input variables. More specifically, each artificial neural network 44 outputs vibration data representing a predicted vibration for an engine in response to the input of flight parameter data and balance weight data for a modeled flight. In accordance with some embodiments, each artificial neural network 44 is trained to establish a mapping or correlation between a multiplicity of inputs in the form of engine rpm; altitude, Mach number, temperature, thrust, and real and imaginary components (i.e., magnitude and phase angle) of a balance weight configuration and an output in the form of real and imaginary components (i.e., amplitude and phase) of a predicted engine vibration.

Artificial neural networks are generally known for their function approximation and pattern recognition performance. Various processes for training an artificial neural network are known. In brief, the artificial neural network may be trained by adjusting model parameters such that application of a set of inputs matches a desired set of outputs. Several differing artificial neural network approaches to the engine unbalance detection problem may be employed. For example, an approach known as back-propagation is the most common method used in the training of feed-forward artificial neural networks (also known as multilayer perception) with differentiable transfer functions to perform function approximation. For example, a typical multilayer perception (MLP) artificial neural network may comprise an input layer having a plurality of inputs, a first hidden layer including a plurality of nodes having respective nodal weights, and finally, an output layer including a plurality of outputs. In an alternative embodiment, the MLP artificial neural network comprises an input layer having a plurality of inputs, a first hidden layer including a first plurality of nodes having respective nodal weights, a second hidden layer including a second plurality of nodes having respective nodal weights, and finally, an output layer including a plurality of outputs.

Generally, training of artificial neural networks can be made more efficient if the data (both the network input and output) can be scaled beforehand. One approach for scaling network inputs and targets is to normalize the mean and standard deviation of the training set, which normalizes the inputs and targets so that they will have zero mean and unity standard deviation. If this preprocessing approach is employed for the training set data, then whenever the trained network is used with new inputs, such new inputs should be preprocessed with the same means and standard deviations that were computed for the training set. The outputs generated from these preprocessed inputs may also be converted back into the same units that were used for the original targets.

Referring again to FIG. 5, each artificial neural network 44 may be implemented as computer code (in a software module) representing instructions to be executed. This computer code is stored in a non-transitory tangible computer-readable storage medium. The operations of the artificial neural networks may be executed by one computer or by multiple computers of a distributed computer system.

In accordance with some embodiments, the engine balancing method depicted in FIG. 5 further comprises the following steps. Flight parameter data, balance weight data and vibration data are acquired from a flight by a test aircraft having an engine to be balanced, wherein the test aircraft is the same type as the reference aircraft (step 46). Then the artificial neural networks 44 are used to predict the engine vibrations that would be produced by each reference aircraft based on the input of flight parameter data and balance weight data from the flight by the test aircraft. The engine vibration predictions (i.e., for matching modeled flights of reference aircraft) output by the artificial neural networks 44 which match or nearly match the engine vibration measurements acquired from the test aircraft during its flight are identified (step 48). For each artificial neural network 44 that produced matching or nearly matching engine vibration predictions, the balance weight configurations in place on the engines for the flights of reference aircraft whose associated artificial neural network produced matching or nearly matching engine vibration predictions are also determined in step 48.

In accordance with one embodiment, step 48 comprises identifying candidate modeled flights of reference aircraft having altitudes for which the associated artificial neural network 44 predicted a maximum vibration, and then identifying engine vibration predictions output by artificial neural networks 44 associated with the candidate modeled flights which match or nearly match the engine vibration measurements acquired from the test aircraft during its flight test.

Optionally, the engine balancing method may further comprise determining whether any of the balance weight configurations determined in step 48 have either an outlier balance weight magnitude or an outlier balance weight phase angle. This is accomplished by comparing the balance weight magnitudes and phase angle to respective ranges of common balance weight magnitudes and phase angles. If a balance weight magnitude lies out of a range of common balance weight magnitudes for a particular range of altitudes and particular range of engine rpm, then that balance weight magnitude is treated as an outlier and the balance weight configuration that includes that balance weight magnitude is no longer treated as a candidate for designation as a recommended balance weight configuration, i.e., is filtered out (step 50). Similarly, if a balance weight phase angle lies out of a range of common balance weight phase angles for a particular range of altitudes and particular range of engine rpm, then that balance weight phase angle is treated as an outlier and the balance weight configuration that includes that balance weight magnitude is no longer treated as a candidate for designation as a recommended balance weight configuration, i.e., is filtered out (step 50). After filtering in step 50, the surviving balance weight configurations are listed in a final report. In other words, the final report does not include balance weight configurations having outlier magnitudes or phase angles.

Still referring to FIG. 5, the final report includes a set of recommendations in the form of balance weight configurations from the flights of reference aircraft whose associated artificial neural network produced matching or nearly matching vibration predictions. This final report will be provided to the technician responsible for the balancing of one or more engines on the test aircraft (step 52). The technician selects one of the recommended balance weight configurations (e.g., the recommended balance weight configuration having the smallest magnitude) (step 54) and then balances the engine by reconfiguring the balance weights attached to the engine on the test aircraft in accordance with the recommended balance weight configuration (step 56). In accordance with one engine balancing procedure, reconfiguring the balance weights comprises attaching or removing balance weights having masses and locations (in a balance plane) as dictated by the selected recommendation.

FIGS. 6A and 6B are diagrams representing respective portions of respective bar charts that are included in the final report in accordance with one embodiment. Each horizontal bar in FIG. 6A has a length corresponding to the magnitude of the mass vector of the balance weight configuration in place on an engine of the identified reference aircraft for a respective one of the plurality of matching modeled flights. Each horizontal bar in FIG. 6B has a length corresponding to the phase angle of the mass vector of the same balance weight configuration in place on the same engine of the same reference aircraft for the same matching modeled flight.

The first column in each of FIGS. 6A and 6B identifies a test aircraft by the fictional tail number AB123 and further identifies its engine E1. The second column lists a set of matching modeled flights 47 through 52, where matching modeled flights 49 and 52 are for a reference aircraft identified by the fictional tail number AC222, matching modeled flights 48 and 51 are for a reference aircraft identified by the fictional tail number AD915, and matching modeled flights 47 and 50 are for a reference aircraft identified by the fictional tail number AE005. The items B1 and B2 identify the flight test used for the respective flight, while items E1 and E2 identify the engine onboard the reference aircraft which was tested. Third column lists the corresponding balance weight magnitudes (FIG. 6A) and corresponding balance weight phase angles of the balance weight configuration in place on the tested engine of each reference aircraft for each matching modeled flight. The values of the balance weight magnitudes and phase angles are indicated by both numbers and bars having lengths proportional to those numbers.

It should be appreciated that the final report may contain sets of bar charts of the types depicted in FIGS. 6A and 6B for each of a multiplicity of new flight tests involving different test aircraft.

Various terms have been defined herein in a precise manner, but some of the terminology may be subject to varied usages in practice across the aviation industry. For the avoidance of doubt concerning the meanings of the terms "balance weight" as compared to "balancing mass", the convention has been adopted herein that the term "balance weight configuration" means a balance solution comprising the placement of one or more balancing masses in a balance plane at respective distances from the axis of rotation and at respective phase angles relative to a reference axis in that balance plane. The product of the balancing mass and the distance from the axis of rotation is referred to in FIGS. 6A and 6B as the "balance weight magnitude", while the phase angle is referred to in FIGS. 6A and 6B as the "balance weight phase". The balance weight configuration comprises the balance weight magnitude and the balance weight phase. Accordingly, the post-neural network operations involved in the method for balancing a gas turbine aircraft engine disclosed herein may be described in the following alternative manner.

For each artificial neural network 44 that produced matching or nearly matching vibration predictions, the magnitude and phase angle of a mass vector for each balance weight configuration that was in place on an engine for the matching modeled flights of reference aircraft are determined in step 48. Then a report is generated (step 52) that includes magnitudes and phase angles of mass vectors determined in step 48. The technician then selects a magnitude and a phase angle included in the report (step 54) and reconfigures the balance weights attached to the engine on the test aircraft in accordance with the selected magnitude and phase angle (step 56).

In accordance with a further aspect, a gas turbine aircraft engine comprising a fan spinner and one or more balance weights attached to the fan spinner is provided, wherein the engine was balanced using the method described with reference to FIG. 5.

The balancing method disclosed herein can be used to determine where and how many balancing masses should be added to an engine or can be used to determine how existing balancing masses are to be adjusted, for example, by adding mass, by moving one or more attached masses to different locations, or by removing one or more attached masses and substituting one or more different masses at the same or different locations.

The above-described balancing methodology can be used to minimize engine vibrations across multiple vibration sensors. In the case of an airplane, this reduction in engine vibration results in decreased transmitted cabin noise and vibration levels along with decreased (cyclical) stress in the support structures. Thus, this balancing method provides an aircraft which operates more quietly and which is subject to less fatigue. Therefore, sound insulation and structural weight may be reduced. The disclosed balancing method also eliminates the cost associated with re-working aircraft engines and verification re-flights.

While various embodiments have been described, it will be understood by those skilled in the art that various changes may be made and equivalents may be substituted for elements thereof without departing from the scope of the teachings herein. In addition, many modifications may be made to adapt a particular situation to those teachings without departing from the scope thereof. Therefore it is intended that scope of the claims set forth hereinafter not be limited to the disclosed embodiments.

As used herein, the term "computer system" should be construed broadly to encompass a system having at least one computer or processor, and which may have multiple computers or processors that communicate through a network or bus. As used in the preceding sentence, the terms "computer" and "processor" both refer to devices having a processing unit (e.g., a central processing unit) and some form of memory (i.e., non-transitory tangible computer-readable storage medium) for storing a program which is readable by the processing unit.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A method for balancing a gas turbine aircraft engine, comprising:
   (a) acquiring flight parameter data, balance weight data and vibration data from one or more flights by each of a multiplicity of reference aircraft, wherein the flight parameter data includes engine revolutions per minute, altitude, Mach number, temperature and thrust;
   (b) using the flight parameter data, balance weight data and vibration data for each flight by each reference aircraft of the multiplicity of reference aircraft to train a respective associated artificial neural network of a multiplicity of artificial neural networks to output vibration data representing predicted vibrations for an engine in response to input of respective flight parameter data for the associated flight, wherein each artificial neural network is trained to establish a mapping or correlation between a multiplicity of inputs in the form of engine revolutions per minute, altitude, Mach number, temperature, thrust, and magnitude and phase angle of a balance weight configuration and an output in the form of amplitude and phase of a predicted engine vibration;
   (c) acquiring flight parameter data, balance weight data and vibration data from a flight by a test aircraft having an engine to be balanced, wherein the flight parameter data includes engine revolutions per minute, altitude, Mach number, temperature and thrust;
   (d) using the artificial neural networks to predict the engine vibrations that would be produced by each reference aircraft based on the input of flight parameter data and balance weight data from the flight by the test aircraft;
   (e) identifying engine vibration predictions output by the artificial neural networks which match or nearly match the engine vibration measurements acquired from the test aircraft during its flight;
   (f) for each artificial neural network that produced matching or nearly matching engine vibration predictions, determining balance weight configurations in place on the engines for the flights of reference aircraft whose associated artificial neural network produced matching or nearly matching engine vibration predictions;
   (g) generating a report that includes a set of recommendations in the form of balance weight configurations from the flights of reference aircraft whose associated artificial neural network produced matching or nearly matching vibration predictions; and
   (h) reconfiguring the balance weights attached to the engine on the test aircraft in accordance with one of the recommendations.

2. The method as recited in claim 1, wherein step (h) comprises attaching or removing balance weights having masses and locations as dictated by the one of the recommendations.

3. The method as recited in claim 1, wherein the balance weight data for each flight comprises data representing a magnitude and a phase angle of a mass vector associated with an engine.

4. The method as recited in claim 1, wherein each balance weight configuration comprises one or more balance weights attached to an engine and having respective masses and respective locations in a balance plane.

5. The method as recited in claim 1, wherein step (e) comprises identifying candidate modeled flights of reference aircraft having altitudes for which the associated artificial neural network predicted a maximum vibration, and then identifying engine vibration predictions output by artificial neural networks associated with the candidate modeled flights which match or nearly match the engine vibration measurements acquired from the test aircraft during its flight test.

6. The method as recited in claim 1, further comprising determining whether a balance weight magnitude of any of the balance weight configurations determined in step (f) is an outlier balance weight magnitude that lies out of a range of common balance weight magnitudes, wherein the report does not include balance weight configurations having outlier balance weight magnitudes.

7. The method as recited in claim 1, further comprising determining whether a balance weight phase angle of any of the balance weight configurations determined in step (f) is an outlier balance weight phase angle that lies out of a range of common balance weight phase angles, wherein the report does not include balance weight configurations having outlier balance weight phase angles.

8. The method as recited in claim 1, further comprising selecting the one of the recommendations having a balance weight configuration with a smallest magnitude.

9. A method for balancing a gas turbine aircraft engine, comprising:
(a) acquiring flight parameter data, balance weight data and vibration data from one or more flights by each of a multiplicity of reference aircraft, wherein the flight parameter data includes engine revolutions per minute, altitude, Mach number, temperature and thrust;
(b) using the flight parameter data, balance weight data and vibration data for each flight by each reference aircraft of the multiplicity of reference aircraft to train a respective associated artificial neural network of a multiplicity of artificial neural networks to output vibration data representing predicted vibrations for an engine in response to input of respective flight parameter data for the associated flight, wherein each artificial neural network is trained to establish a mapping or correlation between a multiplicity of inputs in the form of engine revolutions per minute, altitude, Mach number, temperature, thrust, and magnitude and phase angle of a balance weight configuration and an output in the form of amplitude and phase of a predicted engine vibration;
(c) acquiring flight parameter data, balance weight data and vibration data from a flight by a test aircraft having an engine to be balanced, wherein the flight parameter data includes engine revolutions per minute, altitude, Mach number, temperature and thrust;
(d) using the artificial neural networks to predict the engine vibrations that would be produced by each reference aircraft based on the input of flight parameter data and balance weight data from the flight by the test aircraft;
(e) identifying engine vibration predictions output by the artificial neural networks which match or nearly match the engine vibration measurements acquired from the test aircraft during its flight;
(f) for each artificial neural network that produced matching or nearly matching vibration predictions, determining the magnitude and phase angle of a mass vector for each balance weight configuration that was in place on an engine for flights of reference aircraft whose associated artificial neural network produced matching or nearly matching engine vibration predictions;
(g) generating a report that includes magnitudes and phase angles of mass vectors determined in step (f);
(h) selecting a magnitude and a phase angle included in the report; and
(i) reconfiguring the balance weights attached to the engine to be balanced on the test aircraft in accordance with the selected magnitude and phase angle.

10. The method as recited in claim 9, wherein step (i) comprises attaching or removing balance weights so that a vector sum of mass vectors for the attached balance weights has the selected magnitude and phase angle.

11. The method as recited in claim 9, wherein the balance weight data for each flight comprises data representing the magnitude and the phase angle of the mass vector for each balance weight configuration.

12. The method as recited in claim 9, wherein step (e) comprises identifying candidate modeled flights of reference aircraft having altitudes for which the associated artificial neural network predicted a maximum vibration, and then identifying engine vibration predictions output by artificial neural networks associated with the candidate modeled flights which match or nearly match the engine vibration measurements acquired from the test aircraft during its flight test.

13. The method as recited in claim 9, further comprising determining whether the magnitude of the mass vector of any of the balance weight configurations determined in step (f) lies out of a range of common magnitudes, wherein the report does not include uncommon magnitudes.

14. The method as recited in claim 9, further comprising determining whether the phase angle of the mass vector of any of the balance weight configurations determined in step (f) lies out of a range of common phase angles, wherein the report does not include uncommon phase angles.

15. The method as recited in claim 9, further comprising selecting the smallest magnitude included in the report.

16. A gas turbine aircraft engine comprising a fan spinner and one or more balance weights attached to the fan spinner, wherein the engine was balanced using a method comprising:
(a) acquiring flight parameter data, balance weight data and vibration data from one or more flights by each of a multiplicity of reference aircraft, wherein the flight parameter data includes engine revolutions per minute, altitude, Mach number, temperature and thrust;
(b) using the flight parameter data, balance weight data and vibration data for each flight by each reference aircraft of the multiplicity of reference aircraft to train a respective associated artificial neural network of a multiplicity of artificial neural networks to output vibration data representing predicted vibrations for an engine in response to input of respective flight parameter data for the associated flight, wherein each artificial neural network is trained to establish a mapping or correlation between a multiplicity of inputs in the form of engine revolutions per minute, altitude, Mach number, temperature, thrust, and magnitude and phase angle of a balance weight configuration and an output in the form of amplitude and phase of a predicted engine vibration;
(c) acquiring flight parameter data, balance weight data and vibration data from a flight by a test aircraft having an engine to be balanced, wherein the flight parameter data includes engine revolutions per minute, altitude, Mach number, temperature and thrust;
(d) using the artificial neural networks to predict the engine vibrations that would be produced by each reference aircraft based on the input of flight parameter data and balance weight data from the flight by the test aircraft;
(e) identifying engine vibration predictions output by the artificial neural networks which match or nearly match the engine vibration measurements acquired from the test aircraft during its flight;

(f) for each artificial neural network that produced matching or nearly matching engine vibration predictions, determining the magnitudes and phase angles of mass vectors for balance weight configurations in place on the engines for the flights of reference aircraft whose associated artificial neural network produced matching or nearly matching engine vibration predictions;

(g) selecting a magnitude and a phase angle from the magnitudes and phase angles of mass vectors determined in step (f); and (h) reconfiguring the balance weights attached to the engine to be balanced on the test aircraft in accordance with the selected magnitude and phase angle.

17. The gas turbine aircraft engine as recited in claim 16, wherein step (h) comprises attaching or removing balance weights so that a vector sum of mass vectors for the attached balance weights has the selected magnitude and phase angle.

18. The gas turbine aircraft engine as recited in claim 16, wherein the method further comprises determining whether the magnitude of the mass vector of any of the balance weight configurations determined in step (f) lies out of a range of common magnitudes.

19. The gas turbine aircraft engine as recited in claim 16, wherein the method further comprises determining whether the phase angle of the mass vector of any of the balance weight configurations determined in step (f) lies out of a range of common phase angles.

20. The gas turbine aircraft engine as recited in claim 16, wherein the engine was balanced using a method that further comprises selecting the one of the recommendations having a balance weight configuration with a smallest magnitude.

\* \* \* \* \*